April 16, 1929.  D. R. MURPHY ET AL  1,709,087
COW STANCHION
Filed March 25, 1924   3 Sheets-Sheet 2
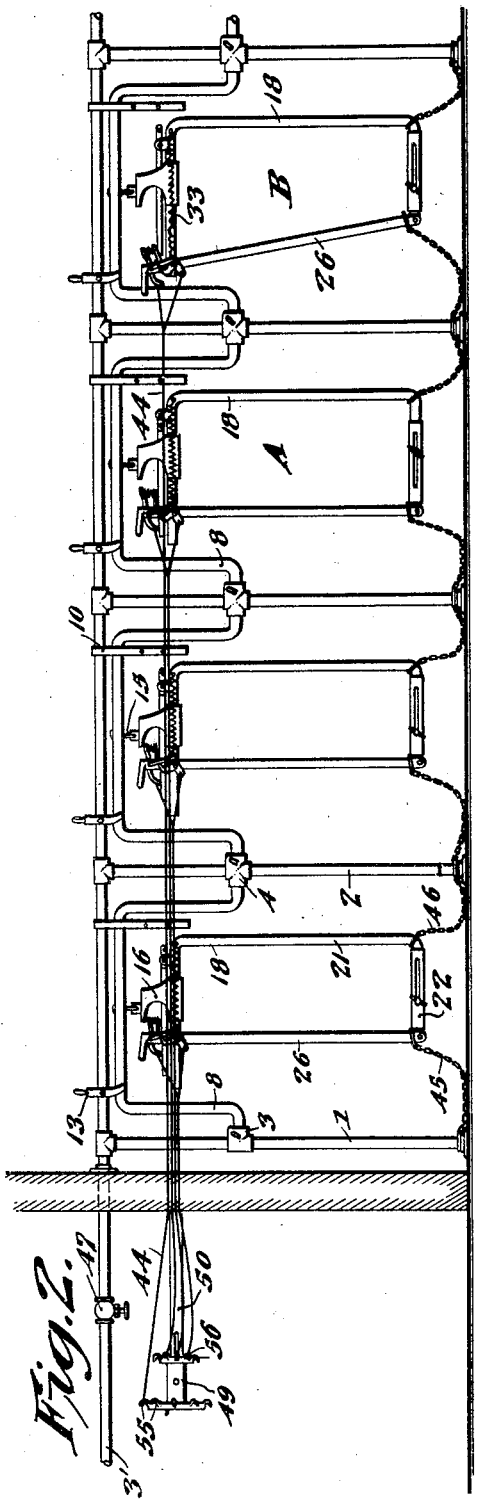
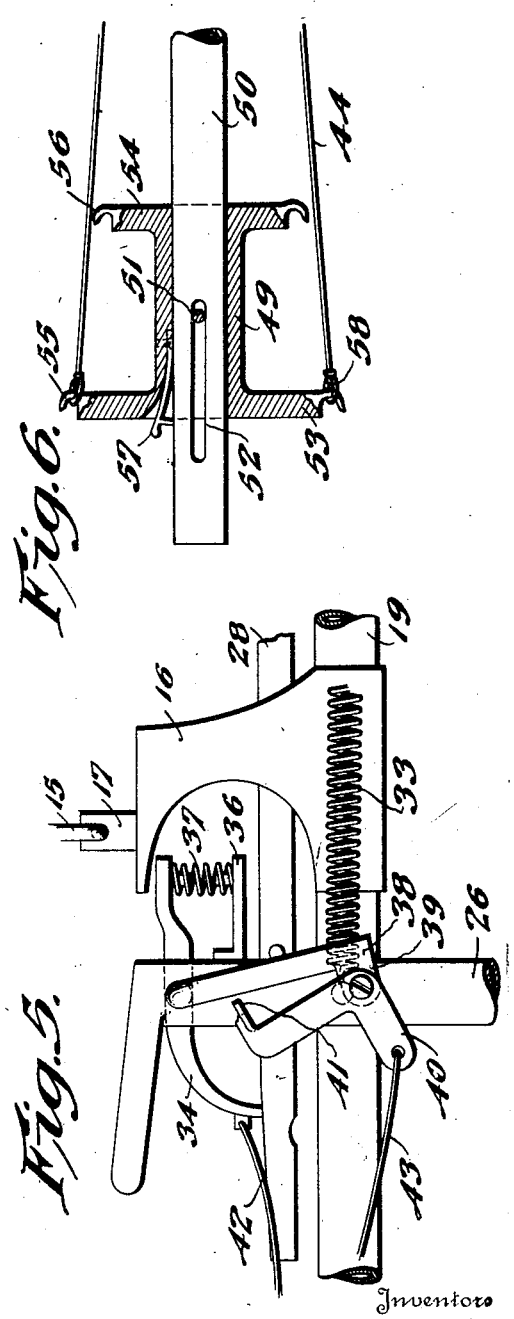
Inventors
Daniel R. Murphy
and John C. Krieg
By Lloyd W. Patch
Attorney April 16, 1929.　　　D. R. MURPHY ET AL　　　1,709,087
COW STANCHION
Filed March 25, 1924　　　3 Sheets-Sheet 3
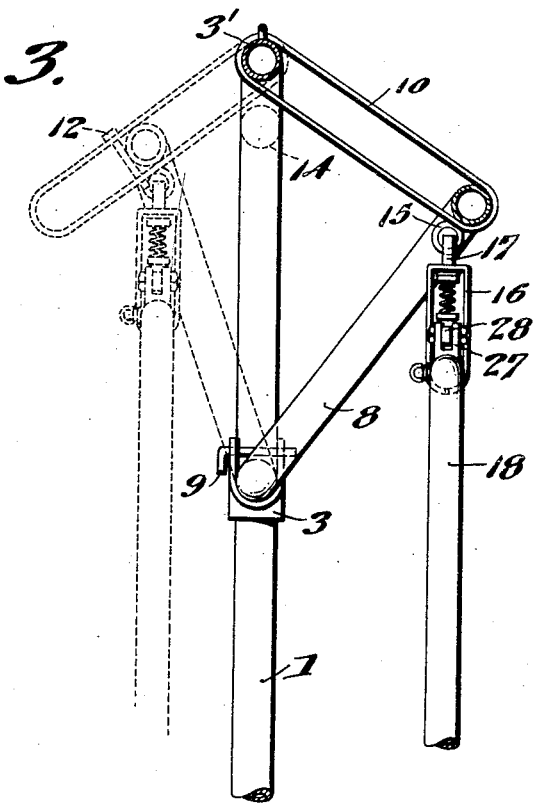
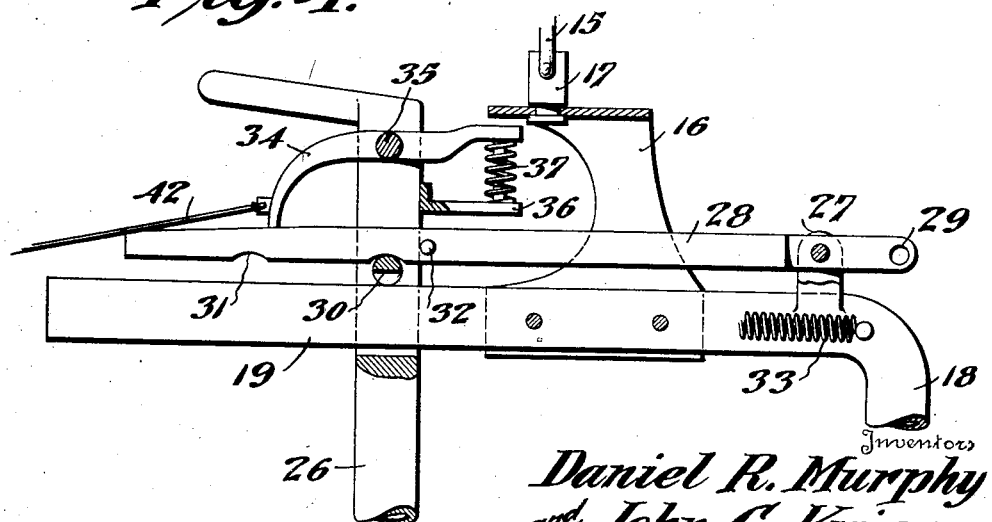
Inventors
Daniel R. Murphy
and John C. Krieg
By Lloyd W. Patch
Attorney Patented Apr. 16, 1929.

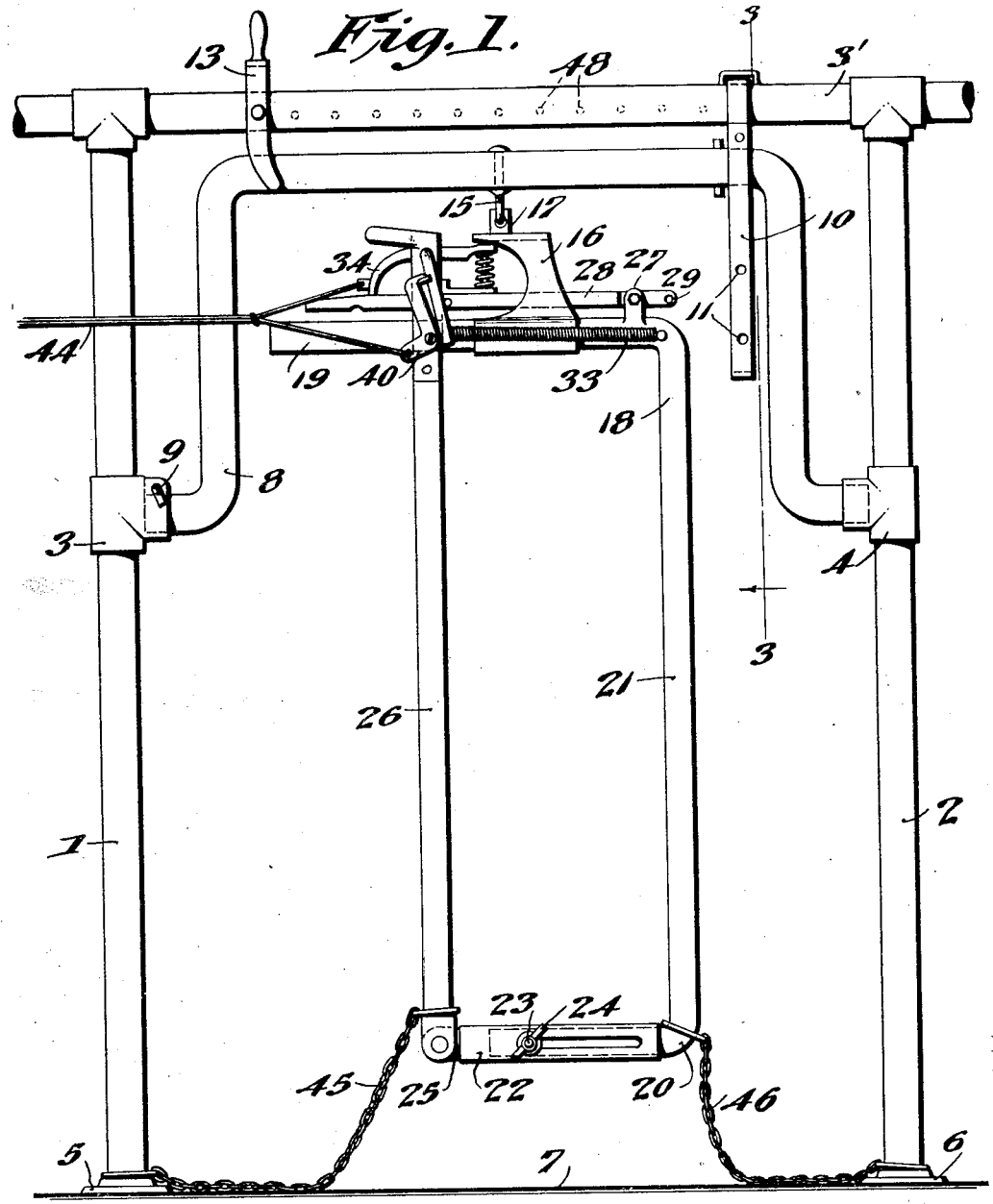

1,709,087

UNITED STATES PATENT OFFICE.

DANIEL R. MURPHY AND JOHN C. KRIEG, OF NEWARK, OHIO.

COW STANCHION.

Application filed March 25, 1924. Serial No. 701,745.

Our invention relates to an improvement in cow stanchions and particularly to a stanchion adapted to be installed and used in dairy barns, and in other like connections.

An object of this invention resides in providing a structure by which the stanchion is carried, which supporting structure is adjustable forwardly and rearwardly to accommodate long and short cows.

A still further object is to so construct and mount the stanchion that the animal is given considerable freedom of movement, but is still securely confined.

With these and other objects in view which will be apparent from consideration of the specification and drawings, our invention includes certain novel features of construction and combinations of parts which will now be set forth in connection with the drawings.

In the drawings:

Figure 1 is a view in elevation of a stanchion constructed in accordance with our invention.

Fig. 2 is a similar view showing a group of stanchions and illustrating the manner in which the control is centralized.

Fig. 3 is a sectional view on line 3—3 of Fig. 1, illustrating the adjustment for long and short cows.

Fig. 4 is a detail view partly in section of the stanchion locking and releasing means.

Fig. 5 is a view in elevation of the parts shown in Fig. 4.

Fig. 6 is a sectional view showing one form of centralized control means which might be employed.

Our present stanchion is made up on the unit plan, each unit being complete within itself. However, the structure is such that two or more units can be assembled as an entirety. One complete unit is illustrated in Fig. 1, and a plurality of units may be assembled after the manner shown in Fig. 2. Where a single unit is employed, the control will not be a problem, but where a number of units are employed in a stable, the control is preferably centralized. It is one of our purposes to provide a locking and releasing means of such character that control can be accomplished from a distant point, and that the whole number of cattle or any individual animal can be released, or certain animals can be excluded in releasing or locking the stanchions.

The supporting columns 1 and 2, which may carry the dividing or supporting rails when a number of units are assembled together, carry a water pipe at their upper ends, this pipe also serving as a spacing member.

The bearing sockets 3 and 4 are cast or otherwise secured on the columns 1 and 2 at the same height above the floor plates or standards 5 and 6 adapted to be secured on the floor 7 of the stable, and a substantially U-shaped supporting yoke 8, provided with bearing trunnions at its ends is adapted to have one bearing trunnion fitted in the socket of bearing member 4 and the remaining bearing trunnion dropped into the open socket of bearing member 3, a pin 9 being provided to close the open socket of bearing member 3 and retain the supporting yoke 8 in place. An elongated loop member 10 is fitted around the pipe 3', and the bottom loop of the U-shaped yoke 8, and this loop member limits swinging movement of the yoke on either side of the supporting standards, after the manner shown in Fig. 3. The loop is provided with a plurality of openings 11, and a pin 12 can be inserted, after the manner shown by the dotted lines to vary the degree of inclination of the supporting yoke 8 either forwardly or rearwardly with respect to the standards 1 and 2. The yoke locking member 13 is carried by the pipe 3' and is provided with arms on each side thereof to engage with the loop of the U-shaped yoke 8 and retain the same in the medial position, as indicated by the dotted line circle at 14, in Fig. 3.

A supporting ring 15 is carried centrally within the loop of the U-shaped yoke member 8, and the head-engaging and animal restraining portions of our mechanism are carried by this ring. A supporting clip 16 has a swivel member 17 revolubly mounted in the upper portion thereof and held in the supporting ring 15, and this clip 16 carries a substantially U-shaped bar 18. This bar 18 has a long arm 19 engaged by the clip 16 to lie in substantially horizontal relation, and a shorter arm 20 at its remaining end, the body portion 21 being disposed substantially vertically. A slotted sleeve 22 is fitted telescopically on the shorter arm 20, and a clamp screw 23 is carried by this arm 20 to work within the slot of the sleeve 22, a thumb nut 24 being provided to hold adjustments of the sleeve. A bearing ear 25 is carried on the sleeve 22, and a restraining bar 26 is pivotally connected at its lower end with this bearing ear 25 and is bifurcated at its upper end to receive the arm 19 of the bar 18.

Bearing ears 27 are provided on the arm 19 of the bar 18, and a locking lever 28 is pivotally connected at one of its ends in these bearing ears, it being preferable that a plurality of openings 29 be provided through the locking bar, so that its length from the pivotal mounting can be adjusted this locking bar 28 extends through the clip 16 and through the bifurcated upper end of the member 26, and the bar 26 is provided with a transverse pin 30, upon which the locking bar 28 rests, the locking bar having grooves or notches 31 to catch over the pin 30. A stop pin 32 is fitted transversely the locking bar 28 to limit swinging movement of bar 26 toward the upright portion 21 of bar 18, and a coil spring 33 is connected with this restraining bar 26 to resiliently urge the same to a position in which it bears against stop pin 32, substantially as shown in Fig. 1.

A presser lever 34 is given rocking movement by a shaft 35 extending across the bifurcated portion of restraining bar 26, above locking bar 28, and this presser lever has one end thereof bent downwardly to press upon the upper edge of locking bar 28. A bracket arm 36 extends from the restraining bar 26, and a coil spring 37 is fitted between this bracket arm and the remaining end of presser lever 34 to resiliently urge the presser end of the lever down against the locking bar 28. With this arrangement the bar 28 is normally resiliently pressed downwardly to hold the pin 30 in engagement in one of the notches 31. The shaft 35 is extended at one end and is bent radially to provide an arm 38, which arm has a bearing ear 39 at its extremity. A releasing finger 40 is given swinging mounting on this bearing 39, and has a contact portion 41 provided to engage the arm 38 at a point adjacent shaft 35. The shaft 35 is radially connected with presser lever 34, and the releasing finger 40 is intended to impart a human touch to the arm 38, similar to the pressure which would be exerted in throwing this arm back by hand, as it has been found that the presser lever is best released in this manner. Cables 42 and 43 are connected with the presser lever 34, and the releasing finger 40, and are joined after the manner shown in Fig. 1, the double cable being extended to a convenient point for operation.

With the parts constructed and mounted as herein set forth, the width of stanchion between the bar portions 21 and 26 can be varied by adjusting the sleeve 22 on the arm 20, and by adjusting the locking bar 28, and the stanchion can thus be adjusted to suit cows having thick and thin necks. A stanchion having a wide adjustment is indicated at A in Fig. 2, and it will be appreciated that any number of stanchions in a stable can be adjusted as to their width, such adjustment being entirely independent of other stanchions. When the stanchion is to be opened as indicated at B, in Fig. 2, the cable 44 is pulled and cables 42 and 43 raise the presser lever 34 from engagement with locking bar 28. When the pressure is removed from the locking bar, the restraining bar 26 will be swung to the open position through the pull exerted on cable 44, and the stanchion-restraining bar will be held in open position by engagement of the locking pin 30 in outermost notch 31, or supplemental means might be provided to secure the cable in the position in which it will positively hold the bar 26 in the open position. Spring 33 normally exerts a resilient closing tension upon the restraining bar 26, and to again close the stanchion and return the parts to the animal securing position, it is only necessary to exert sufficient pull upon the cable 44 to raise the presser lever 34 from the locking bar 28, and to then quickly release the drawing pull upon the cable and permit the restraining bar 26 to be carried to the closed position by the force of spring 33.

As the restraining portion of the stanchion is substantially balanced on swivel 17, it will normally hang suspended in a proper relation irrespective of adjustments of the supporting yoke 8. However, it is desirable that the chains 45 and 46 be connected with the upright bars 26 and 21, and with the supporting standards 1 and 2, to thus limit the swinging movement of the animal securing portion. These chains are made sufficiently long to give all necessary freedom for the animal's movement, but will restrain excessive movement.

It is preferable that the water pipe 3' be extended to have its control valve 47 entirely removed from the cow stable, as this will be found particularly advantageous in case of fire. This pipe 3' has a plurality of perforations 48 on that side away from the feed box, and consequently when the valve 47 is opened water will be sprayed over the space occupied by a cow. It has been found that cattle can be driven from a stable by throwing water upon them, even when the animals are confused by fire and smoke, and this spraying of water through openings 48 will force the animals from the stable. Also, the water can be advantageously used in flushing and cleaning the stable floors.

In Figs. 2 and 6, we have shown a mechanism which can be conveniently used to simultaneously operate a number of stanchions. As here shown, the operating head 49 is mounted on a suitable horizontal pipe or support 50, preferably near the valve 47, or at some other point outside the stable, sliding mounting of the head 49 being limited by a pin 51 traveling in a slot 52 in the pipe or support 50. This head 49 has large and small flanges 53 and 54 at its ends, the flanges being provided with a plurality of hooks 55 and 56 around their peripheries. A spring latch 57 is provided to engage the end of the pipe 50 and hold the head in one of its extreme positions. The cables 44 are provided with rings 58 at their ends, and are made of such length that these rings can be caught over the hooks 55 without releasing the presser levers 34 from the positions in which they retain the locking bars 28 in the locking relation. When it is desired to release the presser levers and to move the bars 26 of one or more stanchions to the open position, the rings 58 of the connecting cables 44 will be caught on hooks 55, and the head 49 is then moved to a position in which spring latch 57 engages the end of pipe 50. Movement of the head will pull upon the cable 44 to release the locking bar and open the stanchion. If it is desired to open certain stanchions and leave others closed, the rings 58 of the cables 44 leading to those stanchions which it is desired to leave closed will be caught over hooks 56, and this gives sufficient slack in the associated cable 44 to permit movement of the head 49 without releasing the lock of the designated stanchion or exerting opening pull upon the restraining bar thereof.

With the parts constructed, mounted and connected in the manner we have set forth, it is possible to lock one cow or a number of cattle in a stable without going near or disturbing the cattle, and the releasing operation can also be accomplished from a distant point; the stanchion-supporting structure can be adjusted forwardly or rearwardly to accommodate long and short cows; and the restraining portion of the stanchion can be adjusted in its width to suit the particular animals to be restrained.

While we have herein shown and described only the certain specific mechanical constructions, and have suggested only certain possible combinations and arrangements of the parts, it will be appreciated that changes and variations can be made in the form and arrangement of the stanchion structure, in the particular assembly where a number of stanchions are embodied in a stable and in the operating means, without departing from the spirit and scope of our present invention.

We claim:

1. A cow stanchion comprising an upright supporting structure, a substantially U-shaped supporting yoke provided with bearing trunnions at its ends, bearings carried by the supporting structure in which said trunnions are journalled to mount the supporting yoke for swinging movement, said U-shaped supporting yoke being normally disposed to loop upwardly and through its swinging mounting being adjustable to have the loop portion thereof disposed forwardly and rearwardly of the supporting structure, means to releasably retain the supporting yoke substantially in line with the supporting structure, an animal securing and restraining structure carried by the supporting yoke, and an elongated link loosely received around the loop of said supporting yoke and a portion of the supporting structure to limit swinging movement of said supporting yoke when released.

2. A cow stanchion comprising an upright supporting structure, a substantially U-shaped supporting yoke provided with bearing trunnions at its ends, bearings carried by the supporting structure in which said trunnions are journalled to mount the supporting yoke for swinging movement, said U-shaped supporting yoke being normally disposed to loop upwardly and through its swinging mounting being adjustable to have the loop portion thereof disposed forwardly and rearwardly of the supporting structure, means to releasably retain the supporting yoke substantially in line with the supporting structure, an animal securing and restraining structure carried by the supporting yoke, an elongated link loosely received around the loop of said supporting yoke and a portion of the supporting structure to limit swinging movement of said supporting yoke when released, said link having openings therethrough spaced from the fitting on the supporting structure, and a pin to be fitted in said openings to vary the limit of movement of said supporting yoke.

In testimony whereof we affix our signatures.

DANIEL R. MURPHY.
JOHN C. KRIEG.